THOMAS & MAST.
Seed Dropper.
No. 35,636. Patented June 17, 1862.
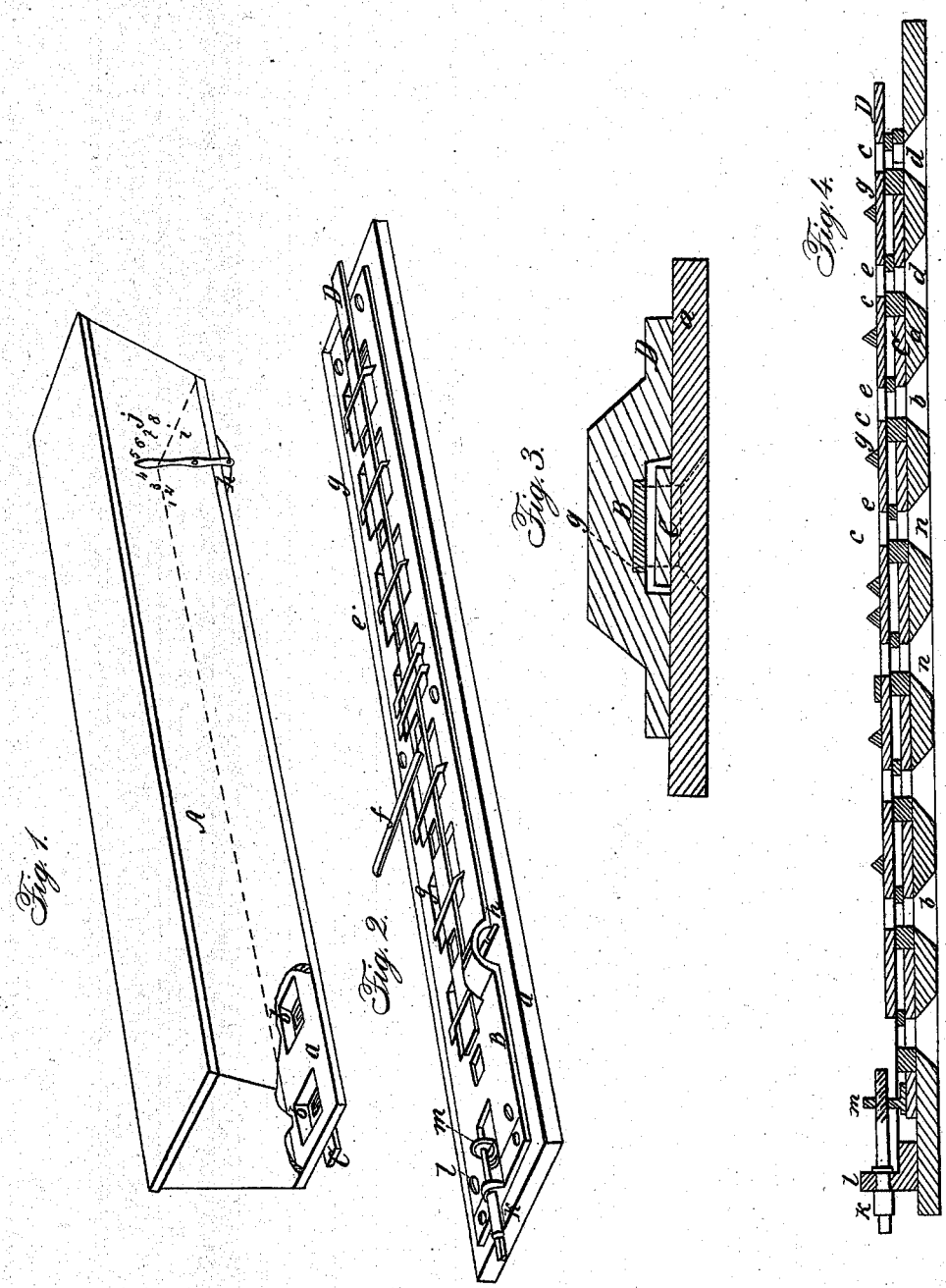
Witnesses:
Geo K Stillman
Charles L Fisher
Inventor:
J. H. Thomas
P. P. Mast

UNITED STATES PATENT OFFICE.

J. H. THOMAS AND P. P. MAST, OF SPRINGFIELD, OHIO.

IMPROVEMENT IN SEED-DRILLS.

Specification forming part of Letters Patent No. 35,636, dated June 17, 1862.

*To all whom it may concern:*

Be it known that we, J. H. THOMAS and P. P. MAST, of Springfield, in the county of Clarke and State of Ohio, have invented certain new and useful Improvements in Grain-Drills; and we do hereby declare that the following is a full, clear, and exact description of the same, reference being had to the accompanying drawings, which, with the letters marked thereon, form a part of this specification.

Our invention relates to the construction of the housing-bar, or the horizontal plate which is secured to the under side of the seed-box for the purpose of holding the different slides by which the delivery of seed is regulated; and it consists in making this bar, which extends the whole length of the seed-box, in one piece, the same having been heretofore made in short sections, which were secured separately to the bottom of the seed-box.

Our invention also consists in making the loops or parts which hold the cut-off slide in one piece with the housing-bar. These were heretofore made separately, and secured to the housing-bar by screws or rivets.

In the accompanying drawings, Figure 1 is a perspective view of the seed-box, to the under side of which the housing-bar is attached; Fig. 2, a view of the under side of the seed-box, showing the housing-bar attached thereto. Fig. 3 is a transverse section of the housing-bar through one of the loops. Fig. 4 is a longitudinal view of the same in section.

Like letters of reference indicate like parts in all the drawings.

A is the seed-box. *a* is the bottom board, which has small apertures *b*, through which seed is fed.

B is the housing-plate, secured by screws to the under side of the bottom board. This plate or bar has square apertures corresponding with the apertures in the bottom board of the seed-box. There are also square projections *c*, which enter square apertures *d* in the regulating-slide C, which will be described.

D is a cut-off slide, having square apertures *e*, corresponding with the apertures *b* and *d*, before mentioned.

*f* is an arm attached to slide D, Fig. 1, which in the complete apparatus is connected with a lever by which the driver is enabled to operate the slide and cause the apertures through which the seed passes to be closed. This slide D rests against the under surface of the housing-bar B, and is held by loops *g*. These loops are cast with the housing-bar, and form a part thereof.

*h* is an arm attached to slide C. At its outer extremity it receives a pivoted index, *i*, (see Fig. 1,) which shows upon the graduated scale *j*, the amount of opening which is afforded for the passage of grain from the seed-box to the ground, indicating thereby the amount of grain or seed that is being sown.

*k* is a temper-screw, which works in an ear, *l*, and enters an ear, *m*, attached to the regulating-slide C. By operating this temper-screw the slide C is moved, and the openings *d*, through which seed escapes, are enlarged or contracted, as the case may be, the degree of opening being indicated by the index above described. It is of importance to secure a perfect uniformity in the size of the openings *d*, by which the discharge of seed is regulated. Hence the edges *n* of the apertures *d*, when the slide is in a position to completely shut off the discharge, should all abut evenly and snugly against the projections *c*, which enter and partly fill them, so that when the slide is moved to open the apertures they will all open alike and permit the discharge of a uniform amount of seed.

It will now be apparent that when the housing bar or plate B is made in sections, and attached to the board bottom of the box continuously, as has been the custom, it is extremely difficult to secure perfect accuracy in the positions of the apertures relatively to the apertures in the regulating-slide C; but if they are all correctly placed and the apertures coincide perfectly when the implement is first made it is found that in a short time the contraction, expansion, and warping of the wood to which they are secured cause their derangement and render the apertures quite unequal. This mode of constructing the housing-bar is also more simple and economical.

The slide D was formerly supported by loops secured by screws to the housing-bar, in the place of which we employ the loops *g*, which, as has been stated, are cast in one part with and form parts of the housing-plate, thus securing a more convenient and cheaper mode of construction.

Having fully described our invention, what we claim as new, and desire to secure by Letters Patent, is the following:

The plate B, provided with the projections c and loops g, the whole being cast in one piece in the manner and for the purpose set forth.

J. H. THOMAS.
P. P. MAST.

Witnesses:
GEO. SPENCE,
BENNETT WHITELEY.